April 4, 1939. P. ZALKIND 2,152,676
DRAWER
Filed Oct. 19, 1935 5 Sheets-Sheet 1
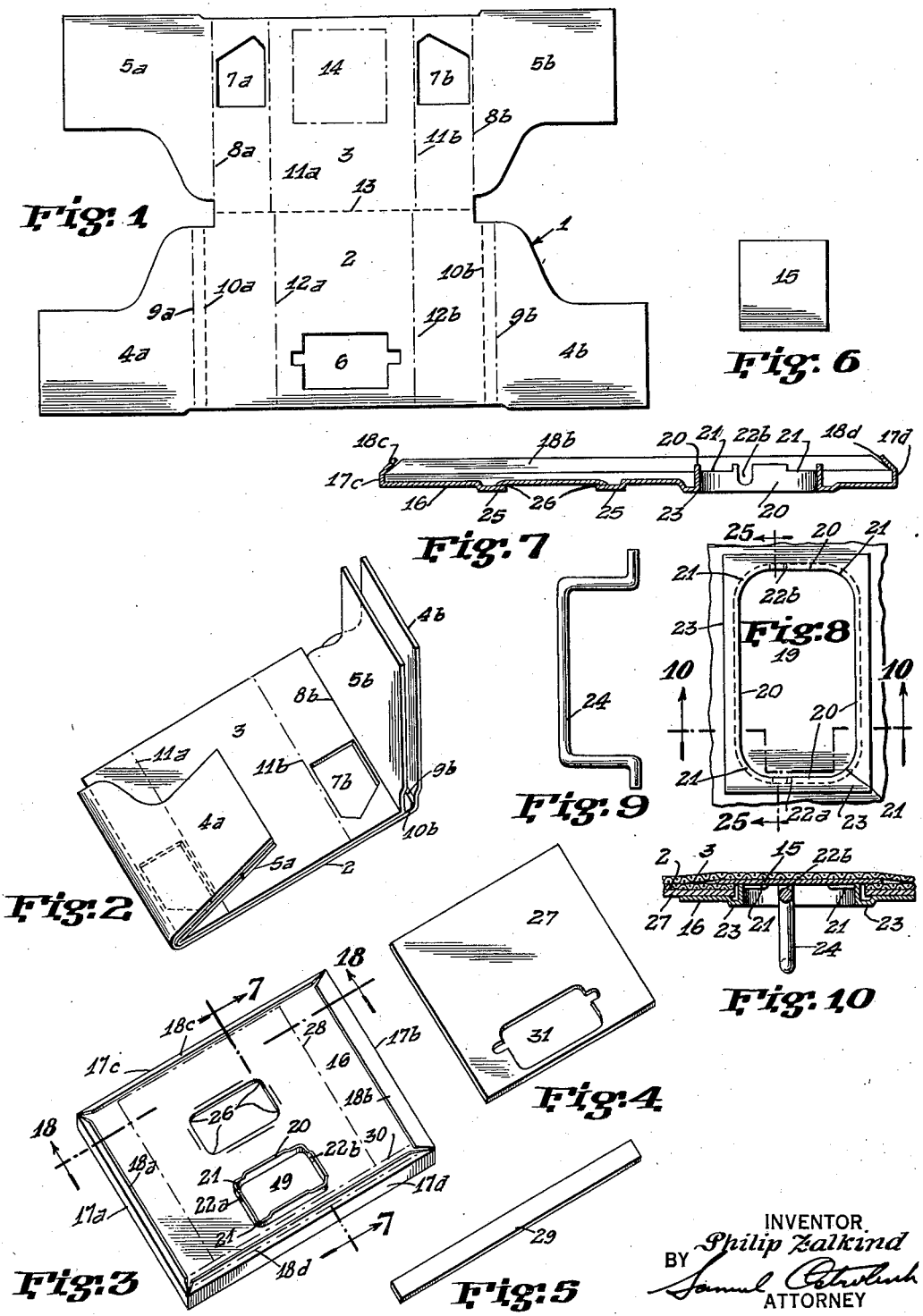

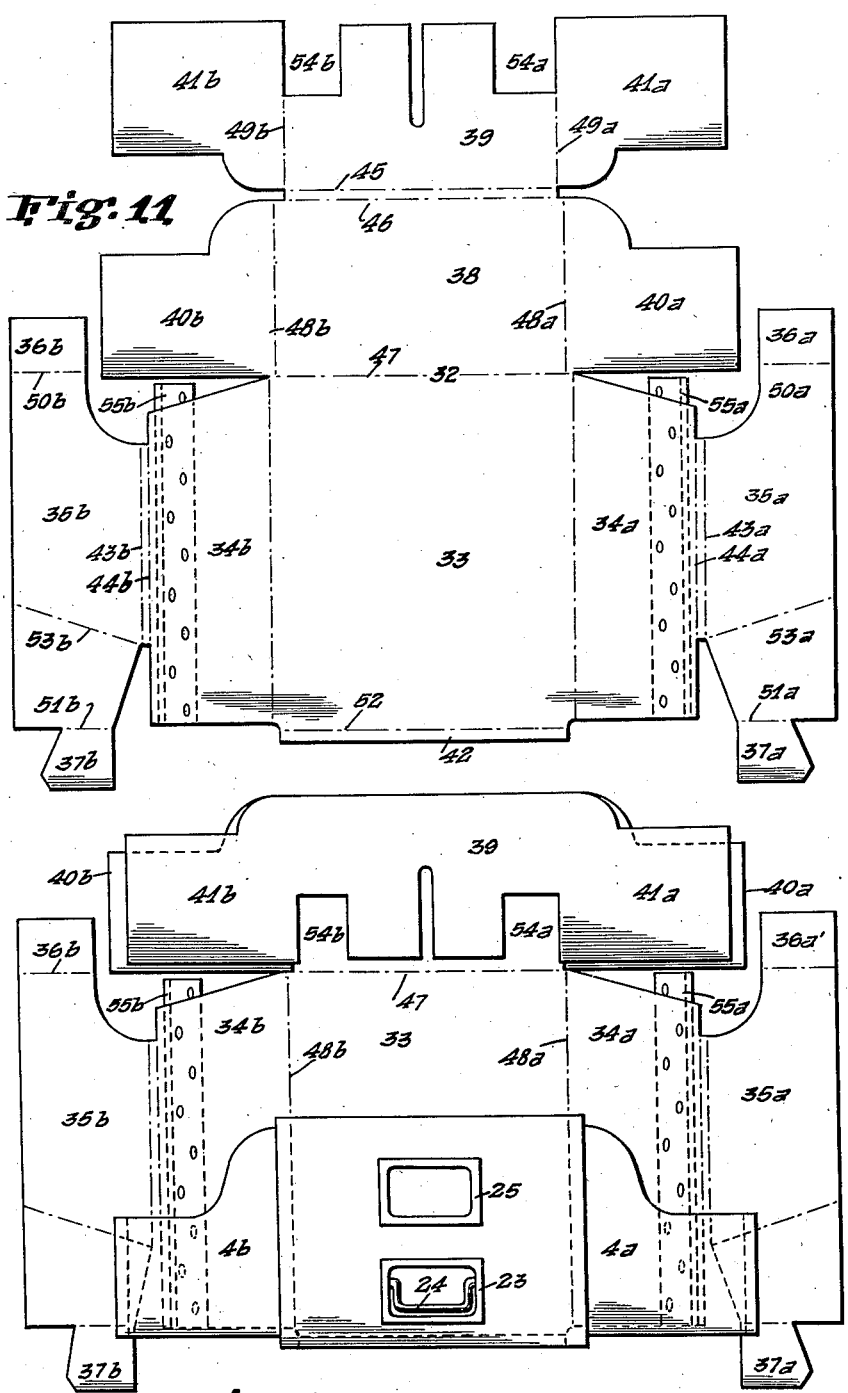

April 4, 1939.   P. ZALKIND   2,152,676
DRAWER
Filed Oct. 19, 1935   5 Sheets-Sheet 3
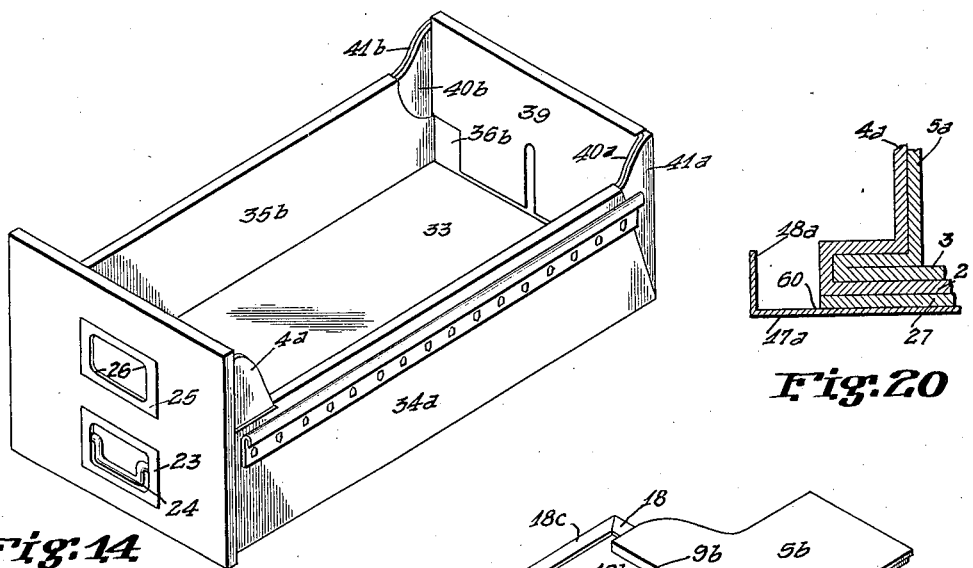
Fig. 14
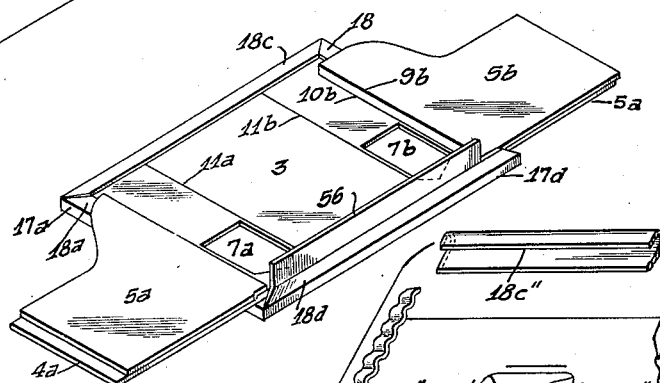
Fig. 20
Fig. 12
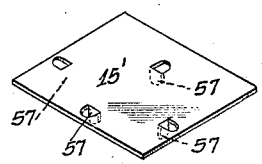
Fig. 16
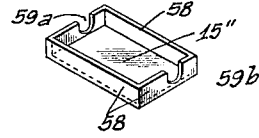
Fig. 17
Fig. 22
Fig. 21
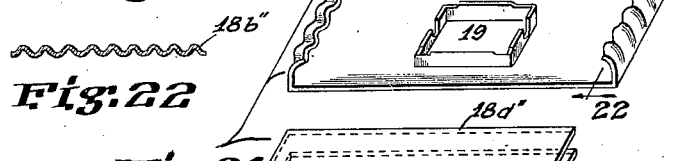
Fig. 19
Fig. 18
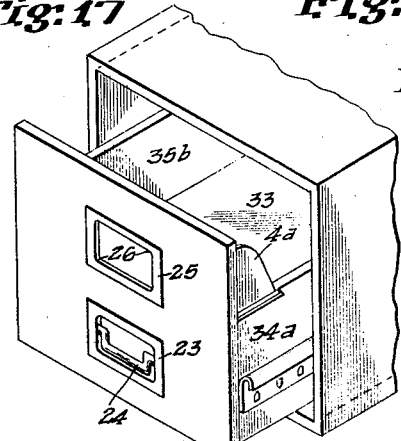
Fig. 15
INVENTOR
BY Philip Zalkind
Samuel Ostrolenk
ATTORNEY April 4, 1939.　　　　　P. ZALKIND　　　　　2,152,676
DRAWER
Filed Oct. 19, 1935　　　5 Sheets-Sheet 4
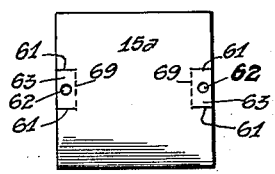
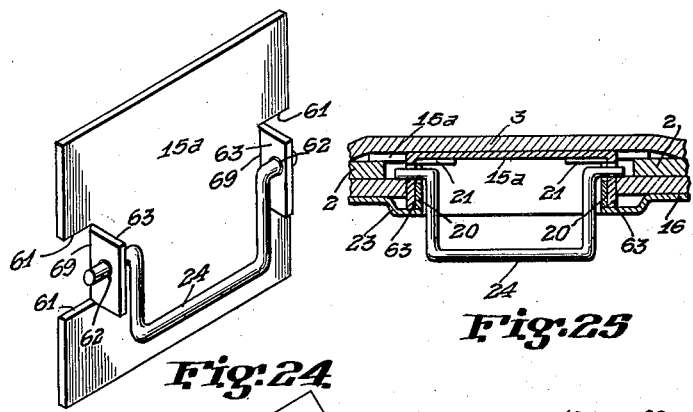
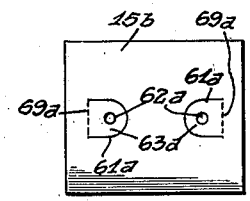
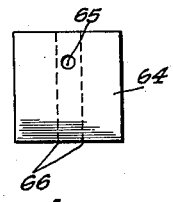
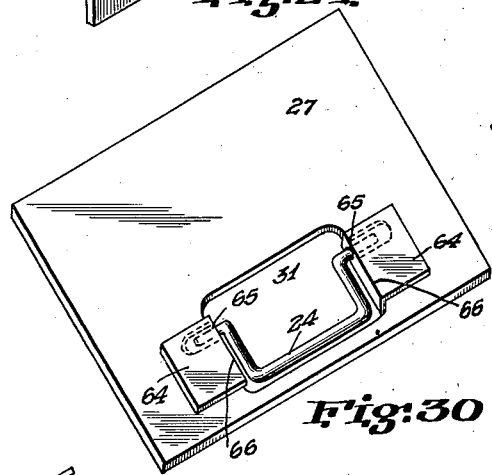
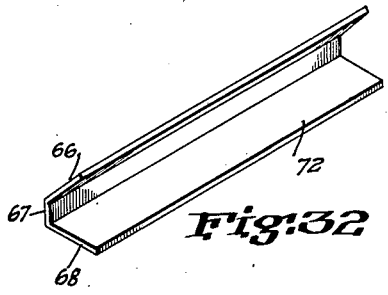
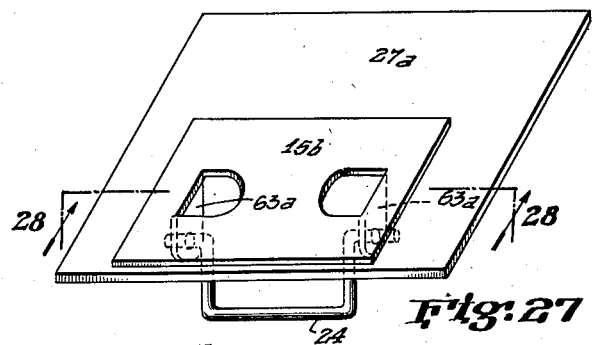
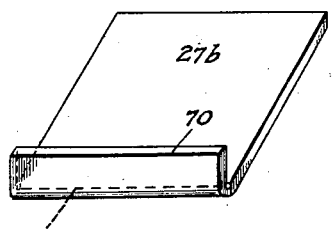
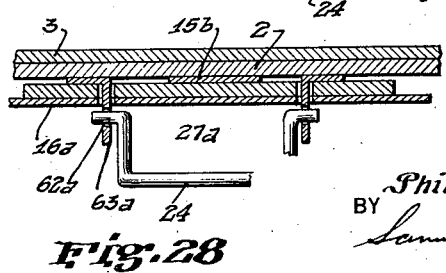
INVENTOR
Philip Zalkind
BY
ATTORNEY Patented Apr. 4, 1939

2,152,676

UNITED STATES PATENT OFFICE 2,152,676

DRAWER

Philip Zalkind, New York, N. Y.

Application October 19, 1935, Serial No. 45,711

11 Claims. (Cl. 229—23)

My invention relates to containers, more particularly to drawers for filing cases and the like, and more specifically, to collapsible drawers having a body of foldable sheet material, such as cardboard, corrugated board, and the like, and a metal face end wall or walls of novel construction.

This application is a continuation in part of my copending application, Serial No. 693,841, filed October 16, 1933, in which is claimed a drawer guide and sub-combinations thereof, and which, in turn, is a continuation in part of Serial No. 631,682 filed September 3, 1932, on which Patent No. 1,946,516 was issued on February 13, 1934.

In Patent No. 1,946,516 I have disclosed a collapsible drawer, having double front walls, rear walls, and side walls, produced from a single blank of sheet material. In one form of that invention an inner ply of the front wall carries a handle, accessible through an opening in the outer ply of the front wall; the front wall is provided with arms or extensions which engage with the side walls for transmitting the pull-tension to the side walls when the drawer is withdrawn from its casing; and the sides of the front wall are substantially flush with the side walls of the drawer. In my copending application Serial No. 693,841 I show additional means for securing front and side walls together.

In Serial No. 693,841, I have disclosed an improvement on this drawer, wherein from a single blank of sheet material, the front wall is provided with side lips or flanges which may cooperate with corresponding rabbets, which may be provided at the mouth of a casing, or extend over corresponding edges of a casing, with which the drawer is to cooperate.

These drawers while commonly used for storage purposes where appearance is of little consequence are occasionally used in offices where it is desirable to increase their aesthetic appearance. In such cases, the practice commonly followed in all office appliances of decorating the fronts to simulate the appearance of metal or wood is desirable. However, the addition of metal to the paper must be applied in a manner which will be inexpensive and still provide a pleasing effect. The obvious procedure would be to secure such a metal facing intended to simulate a cabinet to that portion of the drawer blank which constitutes the front wall, but this is a clumsy method entailing the handling of the entire blank when securing the metal and accordingly is expensive and undesirable.

I have devised a novel arrangement in which I apply the metal facing to a blank which is separate from and independent of the drawer blank but which when assembled constitutes the front wall of the drawer. This assembled front wall section is then secured to those portions of the drawer blank which constitute the side and bottom walls of the assembled drawer, thus producing an inexpensive method of assembly.

In the use of corrugated collapsible drawers, the handle support constitutes a serious problem. Merely mounting the handle in a paper support would not suffice. I have provided a novel means for employing the metal front as a handle support.

A simple bent wire, cooperating with the metal facing, forms a handle. This handle lies recessed within the end wall body, as in the former applications, just referred to, and held in place from the inner side of the wall by suitable backing, which may preferably be a matching sheet of metal, so that the whole front construction has not only the appearance of a metal drawer, but, due to the novel features of combination and construction herein disclosed, it is much more rigid, and is superior in many ways to a drawer front constructed only of metal of the same gauge and weight, or of even substantially heavier gauge and weight.

In this novel construction, I provide a recessed card holder formed as part of the metal facing, with no additional parts whatsoever. Furthermore, in this construction the metal facing not only cooperates with a simple bent wire to form the drawer handle, but also is so formed that mounting for a card is provided with no parts other than the metal facing and its backing. In drawers of relatively small size, wherein the face of the drawer does not provide sufficient space for both a separate card holder of suitable size and a handle space, I can rely entirely on this card-holding means incorporated in the handle space, for holding an identification card.

Whereas the drawers of my former application referred to above comprised a single sheet of blank material, the drawers of this application are preferably made of two sheets of blank material, which are joined together through the agency of the facing metal. One of these sheets of blank material forms the sides, bottom and rear wall of the drawer, and need have associated with it only such metal parts in the way of fittings as are needed to cooperate with the particular casing or cabinet with which the drawer is to be used. The other sheet of blank material, in cooperation with a sheet of metal, forms the front, or end wall, and may have a sunken handle, side flaps for transmitting to side walls the tension due to pulling of the drawer, and may have other means for securing it to the side walls. Though this drawer may be constructed of a single integral blank, this construction has all of the advantages of being more easily handled for assembly in manufacturing, particularly for large sizes, especially when it is required that metal fittings or appurtenances, such as drawer guides, be affixed, to cooperate with companion fittings provided on the casing or cabinet with which the drawer is to be used, as well as in the operation of combining the metal face, the handle and its corresponding wall parts; such fittings may be affixed independently of the operation for applying the metal facing before uniting the sections; thus smaller pieces are handled, and more manufacturing operations affecting any one completed unit may proceed simultaneously than in the handling of the single blank construction.

It will be noted, however, that after the metal faced wall portion and the other portion comprising the container body have been united through the agency of a joint formed by a tab on the body portion, and a channel formed on the bottom edge of the metal front, that the integrated blank so formed has all of the practical advantages of the blank formed from a single piece of sheet material, including that of collapsibility. My drawer blank may be shipped flat and is quickly and easily assembled into set-up position by the user and no extraneous free parts are needed for such assembly.

Objects of my invention are thus:

To provide means for making inexpensive and yet rugged containers of sheet material;

To make containers adapted for shipping in a knocked-down condition and arranged to be easily assembled and erected by the user;

To make containers, which in knocked-down or collapsed condition, lie substantially flat, so as to occupy a minimum of space for shipping and storage;

To make non-metallic containers, having a metal faced wall, or walls, of novel construction;

To provide improved means for mounting a handle;

To provide a metal facing of a collapsible container, in which the handle is mounted in a novel manner and normally lies substantially within the wall body and flush with the face of the wall.

To provide a metal facing, having a novel card holder combination as an integral part of the handle mounting;

To provide a metal facing, having a separate card holder as an integral part of the metal facing.

Other objects of my invention will be apparent from this specification.

My container with the metal faced wall may have affixed thereto various forms of parts and fittings, such as drawer guides, rollers, drawer stops, and roller tracks. Furthermore the body parts comprising the bottom, side walls and back wall, may be variously formed, depending upon the casing or cabinet with which, for instance as a drawer, it is to cooperate, or other specific use to which it may be put. Thus by proper modifications I can use my metal faced front with a casing such as described in my copending application Serial No. 693,841, filed October 16, 1933, or with a cabinet such as described in my copending application Serial No. 739,962, filed August 15, 1934, or with any of the casings shown in my applications entitled: Three sided casing, S. N. 45,714 and End fold casing, S. N. 45,713 filed coincidentally with this application, or with other casings and cabinets. Moreover, I may incorporate with the metal faced front, a drawer body in which is included features disclosed in my applications entitled: Panels, S. N. 45,708, Predetermined bend line, S. N. 45,710, Roller casing, S. N. 45,715, and Clips, S. N. 45,712 and filed coincidentally with this application, or with my application entitled Container fastening means, S. N. 46,316, and filed October 23, 1935.

My invention may best be described by reference to the following drawings which form a part of this specification. In these drawings, Figure 1 shows a blank or development from a sheet of material adapted to be formed into a drawer front in combination with a metal facing and incorporating wings for locking into the side walls of the drawer.

Figure 2 is an isometric view of the blank of Figure 1 after it has been folded back, with the left hand end in position for insertion into the metal facing.

Figure 3 is an isometric view showing the preferred form of metal facing in a position for the insertion of the blank of Figures 1 and 2, the dot and dash lines indicating the position of padding of sheet material to be placed within the metal facing prior to the insertion of the blank.

Figure 4 shows one piece of the padding.

Figure 5 shows another piece of padding.

Figure 6 shows a metal sheet for backing up the handle opening in the metal facing.

Figure 7 is an enlarged cross-section through the metal facing on the line 7—7 of Figure 3.

Figure 8 is a fragmentary plan view (from the inside) of the metal facing showing the handle opening.

Figure 9 shows the handle.

Figure 10 shows a fragmentary section on the line 10—10 of Figure 8 after the handle, padding and front blank have been placed in position.

Figure 11 is a plan of a blank or development from a sheet of material adapted to be formed into the bottom, rear wall and side walls of a drawer.

Figure 12 is an isometric view of the metal faced front, as assembled ready to be united with the body blank of the drawer.

Figure 13 is a plan view showing the metal front united with the body blank and in position to be shipped to the user.

Figure 14 is an isometric view of a drawer as set up by the user from the collapsed form of Figure 13.

Figure 15 is a fragmentary isometric view showing the front end of a casing with the drawer of Figure 14 placed in position in the casing.

Figure 16 is a modification of Figure 6 showing means for positioning the sheet without the use of adhesive.

Figure 17 is a further modification of Figure 6.

Figure 18 is a longitudinal section through the metal facing along the line 18—18 of Figure 3.

Figure 19 is a longitudinal section similar to Figure 18 showing a modification of the metal facing, with the front blank in the position to be attached.

Figure 20 is an enlargement of the left hand portion of Figure 19.

Figure 21 is a fragmentary isometric view showing a modified form of metal facing.

Figure 22 is a fragmentary cross-section along line 22—22 of Figure 21.

Figure 23 shows a modification of Figure 6 in which the plate for backing the handle opening is provided with bearings for the handle.

Figure 24 shows an isometric view of the plate of Figure 23 with a handle attached.

Figure 25 shows a fragmentary section on the line 25—25 of Figure 8 after the handle plate of Figures 23 and 24 and the padding have been placed in position.

Figure 26 shows a further modified plate for backing the handle, similar to Figure 23.

Figure 27 shows an isometric view of the plate of Figure 26 with a handle attached.

Figure 28 shows a fragmentary section on the line 28—28 of Figure 27, after the handle plate and handle of Figure 27, together with the padding have been placed within a modified metal front.

Figure 29 shows a developed blank of metal for use with the pad of Figure 4 to provide handle support.

Figure 30 is an isometric view of the pad shown in Figure 4 with the handle supports of Figure 29 and the handle of Figure 9 attached thereto.

Figure 31 is an isometric view showing a modified form of pad provided with an extension for reinforcing.

Figure 32 is an isometric view showing a metallic channel for reinforcing an edge of the metal front.

Figure 33:
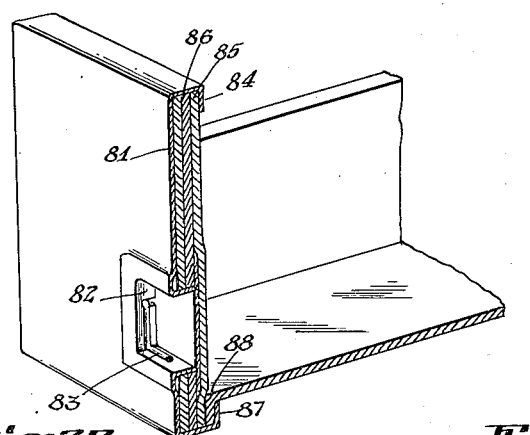
Figures 33 to 37 illustrate modified forms for securing the metal front to the main drawer blank.

Referring to Figure 1, it will be seen that I illustrate a form of drawer front or blank 1 formed by cutting, scoring or stamping from suitable material such as corrugated board, container board and the like. The corrugated board preferably is impregnated with some fireproofing composition, such as carbon tetrachloride, silicate of soda, and various well known metallic salts having fireproofing properties. The blank consists of the front wall 2, front wall extension 3, front wall tongues 4a and 4b, and front wall extension tongues 5a and 5b.

The front wall 2 is provided with an opening 6 for a handle, and the front wall extension 3 is provided with the two openings 7a and 7b for receiving flaps on extensions of the side walls, as disclosed in my Patent 1,946,516 dated February 13, 1934.

The creases 8a and 8b form a line between the front wall extension 3 and the tongues 5a and 5b. The creases 9a and 9b and the cut scores 10a and 10b form lines for marking the limits between the front wall 2 and the tongues 4a and 4b. The cut score 13 forms a line between the front wall 2 and the front wall extension 3. Front wall 2 is furthermore provided with the creases 12a and 12b; and front wall extension 3 is provided with the creases 11a and 11b.

The crease 11a in the front wall extension is offset from the crease 12a in the front wall by an amount substantially equal to the thickness of the blank material. Similarly crease 11b is offset from crease 12b. In both cases the crease in the front wall extension is farther from the center line than the corresponding crease in the front wall. The purpose of these four crease lines will be more fully explained later.

The cut score 10a in the front wall is offset from the line of the crease 8a in the front wall extension, the cut score 10a being farther from the center line than the crease 8a. The crease 9a is displaced from the cut score 10a. The distance between the line of crease 9a from the line of cut score 10a is somewhat shorter than the distance between the line of crease 8a and the line of the cut score 10a, depending upon the thickness of the blank. The spaced relationship of creases 8b and 9b and cut score 10b is similar to the spaced relationship of creases 8a and 9a and cut score 10a just described. As will be seen more clearly later, these scores and creases determine a flange on the sides of the front of the drawer, the width of the flanges being substantially equal to the distance between the crease 9a and the cut score 10a, and the crease 9b and the cut score 10b.

For the purpose of the description that immediately follows, it will be assumed that all the creases and cut scores in blank 1 are on the far side of the sheet as viewed in Figure 1. For assembling blank 1 into the position as shown in Figure 2, a proper cement, such as casein and latex, for uniting metal and fiber are applied over the portion 14 of the blank 1 as indicated in Figure 1 by the dot and dash lines. A metal plate 15 (Figure 6) is then applied to this position on the blank. Suitable glue is then applied to the front wall extension 3, outside of the line of the plate 15 but within the area bounded by the creases 8a and 8b and the cut score 13. The blank is then folded on the cut score 13 and the front wall extension 3 is united with the front wall 2 through the medium of the glued surface on the front wall extension. The metal plate 15 will then completely cover the opening 6 in the front wall, with such finish as may have been applied to the plate 15 being exposed through the opening 6. The extensions 4a, 4b, and 5a and 5b are then folded back as shown on the left hand side of Figure 2, the blank being thereupon ready for insertion into the metal facing, as will be explained more fully.

The metal facing 16, as shown in Figures 3, 7, and 18, comprises a single sheet of metal with the turned up flanges 17a, 17b, 17c and 17d. Each of these flanges has a corresponding lip 18a, 18b, 18c, and 18d turned in at approximately 45°. The metal of the facing may be of any desired thickness, and I prefer to use a range between No. 24 and No. 36 gauges.

In forming the facing 16, an opening 19 is provided with the upturned flange 20 around the entire periphery of the opening. This flange is somewhat less in height at the corners 21 than it is between the corners, except for the two opposed slots 22a and 22b adapted to receive the ends of the bent round wire 24 (see Figure 9) which serves as the drawer handle. In forming the handle opening 19 with its surrounding flange 20, I provide the raised (as viewed from the front of the drawer, see Figures 14 and 15) frame 23 which forms a small panel in which the handle is mounted.

Where the size of the drawer front admits, I may also provide a raised (as viewed from the front of the drawer) frame 25 for use as a card holder. The metal of the front facing is sheared at the four corners of this frame to provide the openings 26 into which the four corners of a card of suitable size may be inserted. As these slits are in the vertical of the frame they do not show from the front and mar the appearance of the front.

It will be noted that the distance between the lips 18c and 18d is somewhat greater than the distance from the center line cut score 13 of the blank 1 to outside edges of front wall 2 and front wall extensions.

It will also be noted that the distance from score 9a to 9b is somewhat less than the distance between the inside of flanges 17a and 17b but somewhat less than the distance between outside edges of flange lips 18a and 18b. Therefore, in order to insert the folded front wall blank within the metal facing, I provide the crease 11a, 12a, 11b, and 12b, previously described, which facilitate binding the lips 18a and 18b. In this way, the folded blank 1 may be inserted within the metal facing 16.

Before inserting the blank, however, the filler piece 27 of suitable material such as fiber board is inserted within the metal face in a position substantially that outlined by the dot and dash lines 28 of Figure 3. The opening 31 of sheet 27 fits over the flanges 20 of the handle opening. After this piece is in place a strip 29 of similar material is inserted in a position substantially that shown by the dot and dash lines 30 of Figure 3. The handle wire 24 is then laid so that its ends lie in slots 22a and 22b.

After inserting the above fillers and handle wire, the folded blank 1 is laid in the metal facing 16 in a manner as has just been described. The front wall, after insertion, is slid within the casing of metal, until the upper edge of the front wall blanks butts against the flange 18c. The blank with the facing is then placed in a press and the flange lips 18a, 18b and 18c are faced down upon the blank. The combined structure formed by the blank 1 and the metal facing 16 thus takes the form substantially as shown in Figure 12.

It will be noted that I make the flange lips 18a and 18b of the metal face narrower than the flange formed between the crease 9a and cut score 10a, and the crease 9b and cut score 10b.

It will also be noted, that after assembling the parts in the manner described, the plate 15 entirely covers the hole 19. This plate 15, thus assembled, appears as a sunken panel on the metal front, when plate 15 and the metal facing 16 are both finished in the manner. Furthermore, the plate 15 effectively closes the slots 22a and 22b as shown in section in Figure 10. The handle wire 24 is thus effectively locked in place within the slots and is free to rotate therein. As viewed from the front, this handle lies completely within the depressed panel formed on the metal facing, as shown in Figures 13, 14, and 15. This gives a neat appearance to the drawer when it is set up, but it is also of great advantage in shipping as no parts extend above the metal facing which aid in the packing and economizes on space.

I have described the flanges 20 around the opening 19 of the metal facing as being of somewhat less height at the corners than between the corners. With this construction, when the blank 1 is inserted within the facing and the plate 15 covers the opening 19, an open slit remains in each of the four corners of the opening 19 adjacent to the plate 15. These slits 21 (as clearly shown in Figure 10) are of similar shape and position within the handle frame 23 as are slots 26 within the card holder frame 25. As I provide such depths to the handle slots 22a and 22b that when the handle wire is in place there is a small space between the wire and the backing plate 15, the four slots 21 may be used for holding the four corners of an identification card which may be inserted to be mounted back of the handle.

It will be noted that when the flanges 18a, 18b, and 18c are bent into place that the blank 1 and the fillers 27 and 29 are effectively locked into place, even if no adhesive is used between the various parts. However, I prefer that a cement for binding metal to paper be used over the face 1 of fillers are inserted into the frame; and that a paper adhesive be applied to the other face of the fillers before inserting the blank 1. In this way, the whole metal faced front becomes a unified structure. Moreover, I have found that when adhesive is used between the metal facings and the filler, these parts are drawn to each other in such a manner that slight irregularities which may have been formed on the facing during the necessary punching and drawing operations are flattened out and removed.

While I have shown the body of the drawer to be made from a separate blank of sheet material than the sheet material forming the main portion of the drawer front, I may under certain circumstances utilize a single sheet of material and combine the blanks of Figure 1 and Figure 11 in a single blank. This may be advantageous in the construction of small drawers. In this case the flap 42 of Figure 11 would be of suitable length and would be integral with bottom member 33 of Figure 11 and front member 2 of Figure 1, and would be provided with suitable score lines.

Moreover, when the body blank is a separate piece from the front wall blank, the flap 42 of Figure 11 may be formed of a separate piece of material, instead of being integral with the bottom wall 33. The material forming the flap may be either metal or fibrous sheet material and would be of sufficient width to partly lap over the bottom 33. This lapping provides a simple method whereby the flap and the bottom member may be united by any suitable means. Where the lapping is done with the flap on the outside of the bottom wall, the distance that the front wall extends below the bottom of the drawer in the set up position will be increased; and where the lapping is done with the flap on the inside of the drawer, the distance that the front wall extends below the bottom of the drawer in the set up position will be decreased. In this way, provision can be made so that the bottom of the drawer and the bottom of the front face will be flush when the drawer is set up.

Figure 11 shows one form of blank for a drawer body suitable for use with my improved metal faced front. However, it will be readily understood that I may make many changes in the details without departing from the scope and spirit of this invention. Moreover, I may incorporate in the drawer body improvements in drawer construction as disclosed in my other copending applications already referred to.

In Figure 11, I illustrate a form of drawer body blank 32 formed by cutting, scoring or stamping from suitable material, such as corrugated board, boxboard and the like. The blank consists of bottom wall 33, the side walls 34a and 34b, the side wall extensions 35a and 35b, the side wall extension tongues 36a, 36b, 37a, and 37b, the rear wall 38, the rear wall extension 39, the rear wall tongues 40a and 40b, the rear wall extension tongues 41a and 41b, and the bottom wall tongue 42.

As shown, the boundary between the side walls and the side wall extensions comprises the double score lines 43a, 44a and 43b, 44b; and the boundary between the rear wall and the rear wall extension is the double score line 45, 46. The score line 47 defines the boundary between the bottom and rear walls. The score lines 48a and 48b define the boundary between the back wall and the back wall tongues; the score lines 49a and 49b define the boundary between the back wall extension and its tongues; the score lines 50a, 50b, 51a and 51b define the boundary between the side wall extensions and their tongues. The score line 52 defines the boundary between the bottom wall 33 and its tongue 42. Each of the side wall extensions has a score line as at 53a and 53b.

The rear wall extension has the two notches 54a and 54b which are of the same dimension as the side wall extension tongues 36a and 36b.

The body may be equipped with such fittings as are necessary to cooperate with the fittings on the casing or cabinet in which the drawer is to operate as for instance the metal track members 55a and 55b. Before attaching these fittings, I prefer that the rear wall extension be bent back on the score lines 45 and 46 and be pasted down upon the rear wall 38. In this way, the handling of the blank is greatly facilitated, as the area of the blank is greatly reduced as compared to a similar size of drawer produced completely from a single blank of sheet material.

Now again referring to Figure 12 which shows the completed metal faced front wall before connection to the drawer body. It will be noted that in the press operation, the lip lid on the flange 17d Figure 3 was not pressed down. It is through this flange extension and the tongue 42 on the body blank that I make a unified structure from the two blanks. Thus, I insert a strip of moistened pregummed paper 56 under the lip lid with the gummed surface facing downward; as shown in Figure 12 and between this pregummed strip and the metal facing 3, I insert the tongue 42 with the body blank in such position that after the lip lid is clinched down, as by placing the structure in a press, the unified blank is assembled complete as shown in Figure 13, with the metal faced front laying back over the body section.

The collapsed blank as shown in Figure 13 is easily erected into a drawer of the form shown in Figure 14. The front wall and the rear walls are first raised at right angles to the bottom wall, and their tongues are then bent toward each other until the tongues are at right angles to their respective walls. The side walls are then bent at right angles to the bottom wall and the side wall extensions are bent over the front and rear wall tongues. The tongue 36a is then inserted into opening 54a; tongue 36b is inserted into opening 7a; and tongue 37b is inserted into opening 7b.

It will be noted that when the metal faced front wall is bent upward at right angles to the bottom wall, a downward depending flange on the front wall is created. This flange unites the two side flanges, and as the front wall extends slightly above front wall tongues, a continuous even frame extends around the rear of the front wall and on the outside of the drawer body. This frame may be used to cooperate with a continuous rabbet around the opening of the casing into which the drawer may be placed, and thus form a substantially dust proof seal when the drawer is in the closed position in the casing.

In Figure 16, I have shown a modification of Figure 6. In this modification the plate 15' for covering the handle opening 19 in the metal face is equipped with lugs 57 made by turning down portions of the plate 15'. These lugs are so spaced that when the plate 15' is placed over opening 19, the lugs 57 will fit over the flange 20 and properly position the plate 15' relative to the metal face 16. When this modified cover plate is used, the cover plate is best cemented onto the front wall 2 with the lugs extending through the opening 6; although it may be cemented on to the front wall extension 3 in position 14 as previously described.

A further modification of the handle opening cover plate is shown as 15'' in Figure 17. Here the cover plate is shown as a box-like structure with the flanges 58 having slots 59a and 59b. When this modified cover plate is used, the handle wire 24 is set in position on the metal facing and the box member 15'' with its depending flanges is set in positon over flange 20 of the metal facing. The slots 59a and 59b of the cover plate match the slots 22a and 22b in the flange 20, thus making a completed metal structure with the handle 24 locked in place, even before the insertion of the front wall and front wall extension members. When these are later inserted the opening 6 fits over the flange 20 and the cover plate 15''.

In Figure 19, I have shown a modification of the metal facing member, wherein it is not necessary to bend the front wall members, along score lines 11a, 12a and 11b, 12b in order to place the front wall blank within the metal facing. Figure 19 is a sectional view similar to Figure 18, except that with the modified facing of Figure 19, the front wall blank is also shown superimposed upon the metal facing to show how it may be inserted within the facing by merely laying it thereupon. It will be noted that at each side of the metal facing on a line where the front wall blank stops, there is a score line 60 in the metal. This is shown in greater detail for the left hand side in Figure 20. This score line 60 serves as a bend line, and when the facing is bent on this line, the portion of the metal face outside of these lines forms the flanges 17a', 17b', 17c' and 17d' which serves the same purpose as the flanges 17a, 17b, 17c, and 17d of Figure 3 as has already been described in detail. Each of the flanges 17a', 17b', 17c', and 17d' is provided with a lip 18a', 18b', 18c' and 18d' for clamping the front wall blank in place. Moreover, lip 18d' is not clamped down until the drawer body blank has been laid in place to be attached to the front wall as has been described.

A further modification of my metal facing is shown in Figures 21 and 22. In this modification, also it is unnecessary to bend the front wall blank along the scores 11a, 12a, 11b, 12b to insert the wall blank into the metal facing, as at least one of the flanges and lips on the metal face is provided as a separate member. In the illustration I have shown the two edge members 18c'' and 18d'' as being removable from the main metal facing, thus providing means for sliding the front wall blank into the facing from one of the edges. After the front wall blank is in place in the metal facing, the piece 18c'' is slipped over the edge and the three lips 18a'', 18b'', and 18c'' are forced into place, thus firmly joining the front wall blank to the metal facing in the manner as has been described. The piece 18d'' is then employed to unite the front wall blank with the drawer body blank.

As I have shown in Figure 21 and more clearly in Figure 22, the side flanges and lips 18a'' and 18b'' are corrugated to provide a great strength at the side walls where the drawer pull is transferred to the side walls. This construction is at times advisable, but where such reinforcing is not necessary, I may use a plain lip at the sides as shown in Figures 3, 18 and 19.

Where the metal facing is of relatively thin material, certain modifications may be made in the construction and still secure the advantages that accure where a heavier gauge of material is used as the metal facing.

Thus where the sheet metal of the facing is reduced below a certain minimum thickness depending upon the particular use to which the drawer is to be put, the handle support may be insufficiently strong and/or the connection between the drawer front and the drawer bottom or the front wall wing may be unduly reduced in rigidity. However, I find that even with a thin metal facing, a substantial construction may be secured utilizing the modifications now to be described.

In Figures 23, 24, and 25 I have shown a modified form of member for backing the handle opening 19 in the metal facing of Figure 3. In Figure 23 the blank 15a is of substantially the same form as the blank 15 shown in Figure 6. However, instead of being a plain sheet as shown in Figure 6, the blank of Figure 23 is slit at 61 and provided with the holes 62 of proper size to fit the handle wire. The slits 61 define the tongues 63 which may be bent on the lines 69. During the bending the handle wire 24 may be inserted into the holes 62, thus forming the structure shown in Figure 24. This handle opening cover may be used in just the same manner as has been described in connection with plate 15 of Figure 6. When plate 15a is laid over the opening 19 in the metal facing the wire 24 will lie within the grooves 22a and 22b in a manner as has been described. However, instead of entirely depending on the strength of the metal back of these grooves for supporting the handle when the drawer is pulled from the casing, the additional thickness of the metal in the tongues 63 acts to take the pull of the handle. Plate 15a with its tongues 63 may, moreover, be of heavier material than the metal facing. In inserting the plate 15a over the handle opening, I prefer that the tongues 63 lie on the outside of the flange 20 around the handle opening, as shown in Figure 25; but in some instances I may provide that the tongues 63 lie on the inside of the flanges 20, in which case they may be seen from the front of the drawer.

In Figure 26, I have shown a modification of Figure 23 wherein the tongues holding the handle are formed from material of the plate 15b lying inwardly from the bend lines 69a instead of from material lying outwardly from the bend line as shown in Figure 23. A plate of this construction, with handle attached, may be used in the same manner as have been described in connection with plate 15 of Figure 6, or plate 15a of Figures 23 to 25.

A modified method of using the plate 15b is illustrated in Figures 27 and 28. In this construction, the metal face is merely slotted to accommodate the tongues 63a. The pad is also shown in a modified form with slots for accommodating the tongues of the plate 15b. This plate is then applied to the pad 27a and to the metal facing 16a with the tongues 63a extending through the pad and the facing. The handle 24 may then be sprung into position in the holes 62a of the tongues 63a. This is clearly shown in section in Figure 28.

In a further modification for reinforcing the handle support, the pad 27 of Figure 4 is provided with metallic reinforcements 64. These reinforcements are of channel shape and may be formed from the blank shown in Figure 29. This blank is provided with the hole 65 for receiving one end of the handle 24. The blank is bent on the lines 66 to form the handle support. One of such supports with the intervening handle is applied on each side of the handle opening 31 of the pad 27. Any suitable means may be used for attaching the channels 64 to the pad 27. When this pad is applied to the metal facing it will lie in substantially the same manner as described in connection with Figure 10. At the same time it will serve as a reinforcement for the handle support.

In Figure 31, I have shown a modified form of pad, having an extended flange 70 bent from the plane of the pad on the bending line 71. This flange 71 is adapted to fit within the channel 18d of the metal facing shown in Figure 3, and adds rigidity to the bottom edge of the drawer front.

In Figure 32, I have shown a metal channel 72 adapted to reinforce any of the edges of the metal facing. The use of this channel will be described in connection with the bottom flange 17d of Figure 3 of the metal face but it will be understood that such reinforcement may be applied equally well to the other edges. Thus referring to Figures 3 and 32, the face 72 of the reinforcement will be substantially parallel to the face 16 of the metal facing, the face 67 of the reinforcement will be substantially parallel to the edge of the metal facing, and the face 66 of the reinforcement will be substantially parallel to the extended flange 18d of the metal facing.

In Figures 33, 34, 35, 36 and 37, I have shown alternative forms for securing the metal front to the fibrous walls of the drawer. In Figure 33, the metal front 81 provided with opening 82 through which handle 83 protrudes has the bent over jaws 84 at the top edge for gripping the handle carrier panel 85 and filler 86. At the lower edge, jaw 87 grips a flap 88 extending from the bottom wall of the drawer and secures the metal front to the main drawer blank. In assembly, after the flap 88 has been inserted between jaw 87 and panel 85, the jaw 87 is pinched into secure engagement with the flap.

Figure 35:
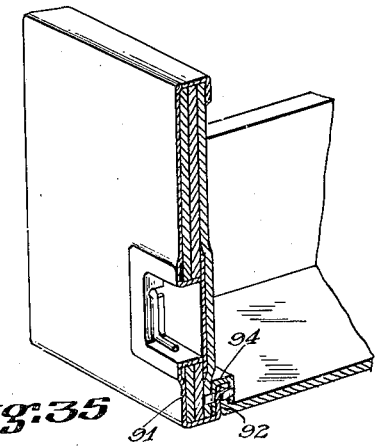
Figure 34:
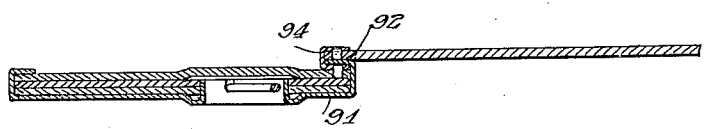

In Figures 34 and 35 the metal front 91 is provided with similar reentrant edge or jaw extensions as at 92. Flap 93 extending from the bottom wall of the drawer is placed in face to face relation with the extensions 92 and a U-shaped metal member 94 then encases the whole. As shown in Figure 35, this may be done with the parts flattened out to make for easy assembly. After the U has been placed to envelope extensions 92 and flap 93, they are pinched together into a rigidly secured assembly.

Figure 36:
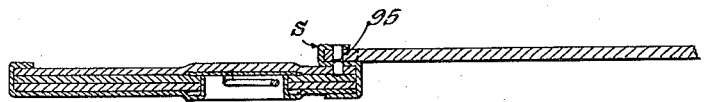
Figure 37:
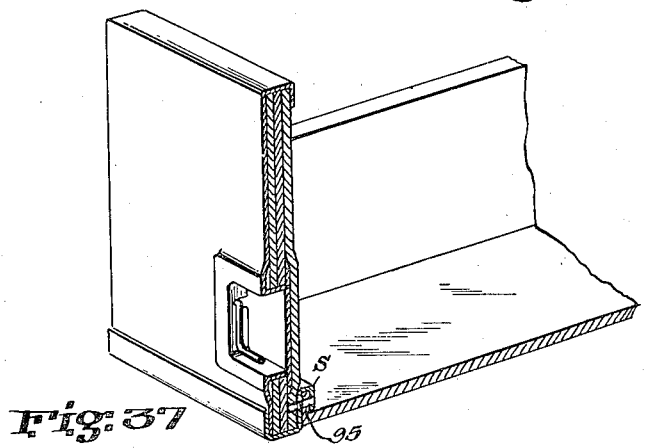

In Figures 36 and 37, I have shown a further modification instead of extensions on the metal front 94, a metal S shaped clamp grips the front and the flap extensions 95 of the bottom wall of the drawer. In assembling the parts, the front metal wall is laid out as an extension of the bottom wall as shown in Figure 36. The S-shaped clamp is first fitted over the bottom edge of the metal front and then the bottom wall is fitted into place in the remaining portion of the S. When so placed, the S is clamped into gripping engagement with the lower edge and the flap extension.

As a further means for securing the metal front to the drawer blank, I may provide prongs stamped out of the metal either before the U shape has been stamped out at the edge or after such bending. The latter has certain advantages in that it overcomes the problems which arise in attempting to bend the metal into a U with prongs already stamped out. Similarly the separate clamps may also have prongs stamped out and secured to the blank in the manner shown and described in my copending application, Serial No. 693,841, filed October 16, 1933.

The reinforcement 72 may be inserted along the edge of the reinforcement before the packing is applied to the metal facing; or the reinforcement 72 may be added to any of the edges of the facing after the drawer front is otherwise completely assembled. The reinforcement 72 may be coextensive with the edge of the facing to which it is applied, or it may consist of one or more short pieces applied only to a portion of the edge where strength is most desired. While I have shown the reinforcement 72 in Figure 32 as having three substantially smooth faces, it will readily be understood that the reinforcements may be otherwise shaped, as for instance it may be corrugated as is shown for the edges 18a" and 18b" in Figures 21 and 22. Such corrugated reinforcements may be used with a form of facing with substantially smooth channel edges such for instance as are shown in Figure 3.

I have now described my invention in a manner that it may readily be understood by one skilled in the art. It will be readily apparent that many changes may be made in the details without departing from the scope of the appended claims.

I claim:

1. In a collapsible container, a first blank of sheet material scored to be folded into body walls for said container, including a bottom wall provided with an integral tab at its front end; a front wall panel comprising a second blank of sheet material and a blank of sheet metal, said blank of sheet metal having a flanged extension on its top and sides encompassing and clinching said second blank of sheet material, whereby said second blank of sheet material and said blank of sheet metal are firmly secured to each other substantially continuously along their side and top edges; and metallic means extending substantially along the entire length of the bottom of said front wall panel and clinched over said integral tab at the front end of the bottom wall of said first blank of sheet material, whereby said second blank of sheet material and said blank of sheet metal are firmly secured to each other substantially continuously along their bottom edge, and whereby said front panel and said first blank of sheet material are firmly secured to each other substantially continuously along the bottom edge of said front panel and along the front edge of the bottom wall of said first blank.

2. In a collapsible container, a first blank of sheet material scored to be folded into body walls for said container, including a bottom wall provided with an integral tab at its front end; a front wall panel comprising a second blank of sheet material and a blank of sheet metal, said blank of sheet metal having a flanged extension on its top and sides encompassing and clinching said second blank of sheet material, whereby said second blank of sheet material and said blank of sheet metal are firmly secured to each other substantially continuously along their side and top edges; and metallic means extending substantially along the entire length of the bottom of said front wall panel and clinched over said integral tab at the front end of the bottom wall of said first blank of sheet material, whereby said second blank of sheet material and said blank of sheet metal are firmly secured to each other substantially continuously along their bottom edge, and whereby said front panel and said first blank of sheet material are firmly secured to each other substantially continuously along the bottom edge of said front panel and along the front edge of the bottom wall of said first blank, said metallic means being integral with said blank of sheet metal.

3. In a collapsible container, a first blank of sheet material scored to be folded into body walls for said container, including a bottom wall provided with an integral tab at its front end; a front wall panel comprising a second blank of sheet material and a blank of sheet metal, said blank of sheet metal having a flanged extension on its top and sides encompassing and clinching said second blank of sheet material, whereby said second blank of sheet material and said blank of sheet metal are firmly secured to each other substantially continuously along their side and top edges; and metallic means extending substantially along the entire length of the bottom of said front wall panel and clinched over said integral tab at the front end of the bottom wall of said first blank of sheet material, whereby said second blank of sheet material and said blank of sheet metal are firmly secured to each other substantially continuously along their bottom edge, and whereby said front panel and said first blank of sheet material are firmly secured to each other substantially continuously along the bottom edge of said front panel and along the front edge of the bottom wall of said first blank, said metallic means being an S shaped metallic strip one leg of which encompasses the bottom edge of second blank of sheet material and the other leg of which encompasses said integral tab at the front edge of the bottom wall of said first blank.

4. In a collapsible container, a first blank of sheet material scored to be folded into body walls for said container, including a bottom wall provided with an integral tab at its front end; a front wall panel comprising a second blank of sheet material and a blank of sheet metal, said blank of sheet metal having a flanged extension on its top and sides encompassing and clinching said second blank of sheet material, whereby said second blank of sheet material and said blank of sheet metal are firmly secured to each other substantially continuously along their side and top edges; and metallic means extending substantially along the entire length of the bottom of said front wall panel and clinched over said integral tab at the front end of the bottom wall of said first blank of sheet material, whereby said second blank of sheet material and said blank of sheet metal are firmly secured to each other substantially continuously along their bottom edge, and whereby said front panel and said first blank of sheet material are firmly secured to each other substantially continuously along the bottom edge of said front panel and along the front edge of the bottom wall of said first blank, said metallic means being an integral S shaped extension of said blank of sheet metal, one leg of which encompasses the bottom edge of said second blank of sheet material and the other leg of which encompasses said integral tab at the front edge of the bottom wall of said first blank.

5. In a collapsible container, a first blank of sheet material scored to be folded into body walls for said container, including a bottom wall provided with an integral tab at its front end; a front wall panel comprising a second blank of sheet material and a blank of sheet metal, said blank of sheet metal having a flanged extension on its top and sides encompassing and clinching said second blank of sheet material, whereby said second blank of sheet material and said blank of sheet metal are firmly secured to each other substantially continuously along their side and top edges; and metallic means extending substantially along the entire length of the bottom of said front wall panel and clinched over said integral tab at the front end of the bottom wall of said first blank of sheet material, whereby said second blank of sheet material and said blank of sheet metal are firmly secured to each other substantially continuously along their bottom edge, and whereby said front panel and said first blank of sheet material are firmly secured to each other substantially continuously along the bottom edge of said front panel and along the front edge of the bottom wall of said first blank, said metallic means comprising a U shaped integral extension of said blank of sheet metal and providing a flanged extension on the bottom of said front wall panel protruding below said bottom wall when the container is assembled in erected condition.

6. In a collapsible drawer an outer front wall of fibrous sheet material having an opening for receiving a handle; an inner front wall of fibrous sheet material secured to said outer front wall; a metal plate lying between said inner and outer walls of fibrous sheet material in a position to form a backing for said opening in said outer wall; and a metallic sheet secured to said fibrous walls and having a flanged opening registering with the opening in said outer wall and with said metal plate.

7. In a collapsible drawer an outer front wall of fibrous sheet material having an opening for receiving a handle; an inner front wall of fibrous sheet material secured to said outer front wall; a metal plate lying between said inner and outer walls of fibrous sheet material in a position to form a backing for said opening in said outer wall; and a metallic sheet secured to said fibrous walls and having a flanged opening registering with the opening in said outer wall and with said metal plate, portions of the edges of the flanges of said flanged opening lying in contact with the surface of said metal plate.

8. In a collapsible drawer an outer front wall of fibrous sheet material having an opening for receiving a handle; an inner front wall of fibrous sheet material secured to said outer front wall; a metal plate lying between said inner and outer walls of fibrous sheet material in a position to form a backing for said opening in said outer wall; a metallic sheet secured to said fibrous walls and having a flanged opening registering with the opening in said outer wall and with said metal plate; openings in the flanges on opposed sides of said flanged opening; and a bent wire lying in said openings in said flanges and held in position by the metal plate lying between the inner and outer walls of fibrous sheet material, said bent wire serving as a handle for said drawer.

9. In a collapsible drawer; a front wall panel of fibrous sheet material, an opening in said panel for receiving a handle, a metal member backing said opening, a metal facing member having an opening therein in registry with said opening in said front wall panel and with said metal backing member, an integral flange circumscribing said opening in the metal facing member, opposed openings in said flange, a bent wire having its ends within said opposed openings, and portions of the edges of said flange in contact with said metal backing member to retain said bent wire within said opposed openings.

10. In a collapsible drawer, a front wall panel of fibrous sheet material, an opening in said panel, a metal member backing said opening, a metal facing member having a opening therein in registry with said opening in said front wall panel and with said metal backing member, a handle lying within said openings, integral inwardly turned flanges on the periphery of said opening in said metal facing member, and opposed openings in said flanges adapted to receive the ends of said handle.

11. In a collapsible drawer, a front wall panel of fibrous sheet material, a metal backing member for same, a metal facing member, holes in the metal facing member and panel of fibrous sheet material, a handle, and means integral with said metal members for securing said handle in position.

PHILIP ZALKIND.